United States Patent
Yamaguchi et al.

(10) Patent No.: US 9,292,142 B2
(45) Date of Patent: Mar. 22, 2016

(54) ELECTRONIC DEVICE AND METHOD FOR DETERMINING COORDINATES

(71) Applicant: PANASONIC CORPORATION, Osaka (JP)

(72) Inventors: Takeshi Yamaguchi, Kanagawa (JP); Mitsuru Satou, Kanagawa (JP); Kiyoshi Ikeda, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/164,497

(22) Filed: Jan. 27, 2014

(65) Prior Publication Data

US 2014/0267154 A1 Sep. 18, 2014

(30) Foreign Application Priority Data

Mar. 14, 2013 (JP) ................................. 2013-052226

(51) Int. Cl.
*G06F 3/044* (2006.01)
*G06F 3/041* (2006.01)

(52) U.S. Cl.
CPC .............. *G06F 3/044* (2013.01); *G06F 3/0416* (2013.01); *G06F 2203/04101* (2013.01)

(58) Field of Classification Search
CPC ................ G06F 3/044; G06F 3/03416; G06F 2203/04101
See application file for complete search history.

(56) References Cited

U.S. PATENT DOCUMENTS

| 2005/0264523 | A1 | 12/2005 | Yoshida et al. | |
|---|---|---|---|---|
| 2006/0033729 | A1 | 2/2006 | Yoshida et al. | |
| 2010/0134423 | A1* | 6/2010 | Brisebois et al. | 345/173 |
| 2010/0245295 | A1 | 9/2010 | Kimpara | |
| 2010/0259504 | A1* | 10/2010 | Doi et al. | 345/174 |
| 2010/0302205 | A1 | 12/2010 | Noma | |
| 2013/0207913 | A1* | 8/2013 | Takashima et al. | 345/173 |

(Continued)

FOREIGN PATENT DOCUMENTS

| JP | 2005-339444 | 12/2005 |
|---|---|---|
| JP | 2006-053663 | 2/2006 |

(Continued)

OTHER PUBLICATIONS

Office Action (Reason for refusal) in Japan Patent Application No. 2013-52226, mail date is Oct. 14, 2014, together with English language translation thereof.

(Continued)

*Primary Examiner* — Aneeta Yodichkas
(74) *Attorney, Agent, or Firm* — Greenblum & Bernstein, P.L.C.

(57) ABSTRACT

The electronic device has a display section with a display surface; and a touch panel that is provided while being superimposed on the display section and that can detect an area occupied by an indicator in which the occupied area is on a predetermined plane which is approximately parallel to and spaced apart by a predetermined distance from the display surface of the display section. When flattening of the area occupied by the indicator is smaller than a threshold value in which the occupied area is on the predetermined plane spaced apart from the display surface of the display section by a predetermined distance, coordinates of the center of the area are made valid. When the flattening is greater than the threshold value, the coordinates of the center of the area are made invalid.

7 Claims, 19 Drawing Sheets

(56) References Cited

U.S. PATENT DOCUMENTS

| | | |
|---|---|---|
| 2013/0328832 A1 | 12/2013 | Boumgarten |
| 2014/0028557 A1 | 1/2014 | Otake et al. |

FOREIGN PATENT DOCUMENTS

| | | |
|---|---|---|
| JP | 2009-003716 | 1/2009 |
| JP | 2010-238094 | 10/2010 |
| JP | 2012-164060 | 8/2012 |
| WO | 2012/111010 | 8/2012 |

OTHER PUBLICATIONS

U.S. Appl. No. 14/236,097 to Masatoshi Nakao, filed Jan. 30, 2014.
U.S. Appl. No. 14/164,521 to Tomoki Takano et al., filed Jan. 27, 2014.
U.S. Appl. No. 14/164,458 to Tomoki Takano et al., filed Jan. 27, 2014.
U.S. Appl. No. 14/235,143 to Tatsuro Igarashi et al., filed Jan. 27, 2014.

\* cited by examiner

*FIG. 8*

X AXIS
Y AXIS

| $f_1$ | $f_2$ | $f_3$ | | |
|---|---|---|---|---|
| | | | | |
| | | | | |
| | | | | |
| | | | | |
| | | | | |
| | | ... | $f_{n-1}$ | $f_n$ |

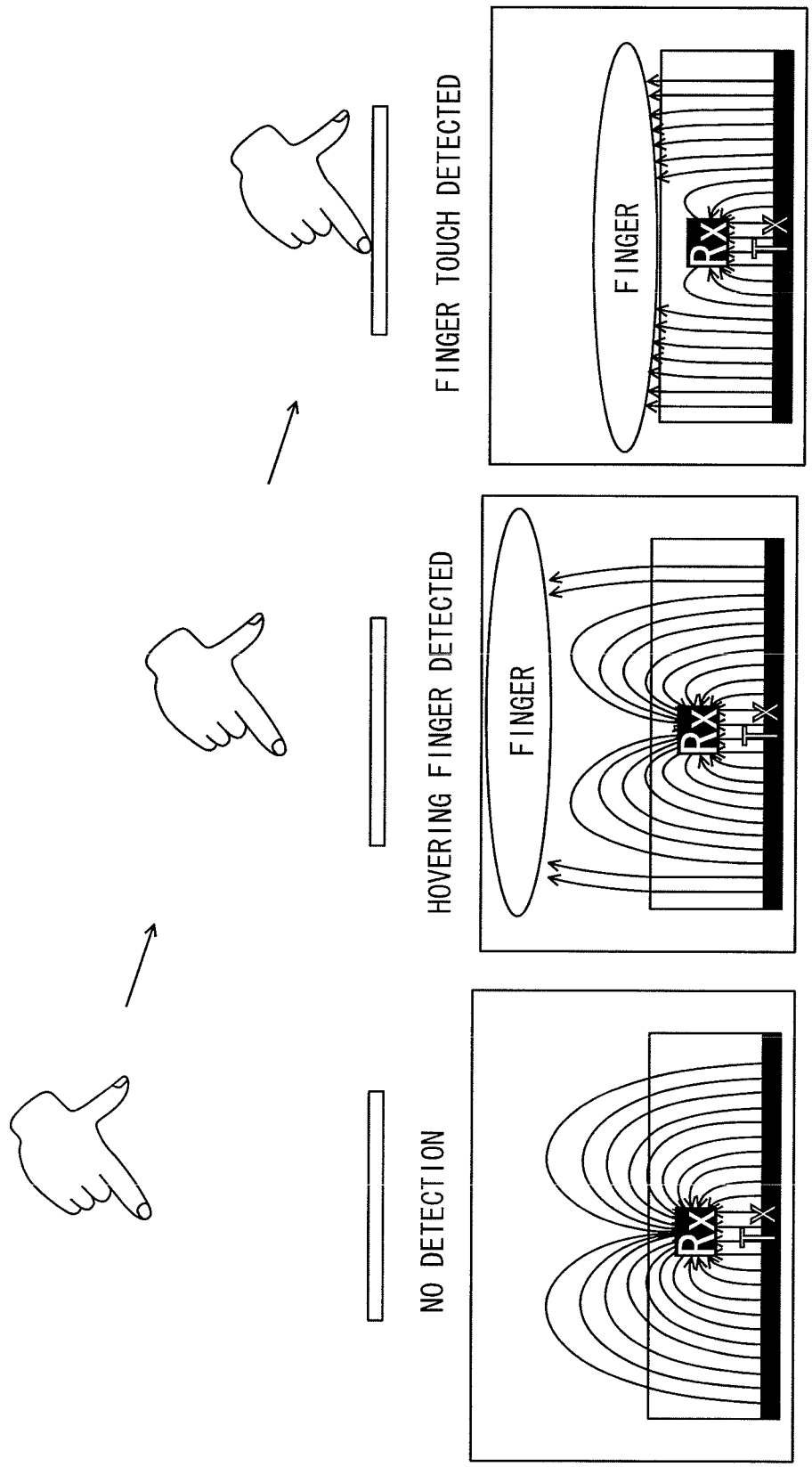

ELECTRONIC DEVICE AND METHOD FOR DETERMINING COORDINATES

CROSS REFERENCE TO RELATED APPLICATIONS

This application is based on and claims the benefit of Japanese Patent Application No 2013-052226 filed on Mar. 14, 2013, the contents of which are incorporated herein by reference in its entirety.

BACKGROUND

The invention relates to an electronic device equipped with a touch panel and a method for determining coordinates.

As is well known, a touch panel is a combination of a display device, like a liquid crystal panel, with a touch pad (a position input device).

Some touch panels are of a capacitive type. The capacitive type touch panel enables performance of manipulation at a height within a predetermined range without contact of an indicator (a user's finger, a pen, and the like) with a panel screen (the proximal operation is hereunder called "hover manipulation"). FIG. 18 is a drawing showing a basic configuration of the capacitive type touch panel. In the drawing, a transmission electrode 101 and a receiving electrode 102 are disposed at a position distant from each other under a bottom surface of a plate-shaped dielectric 100. A drive pulse is applied from a drive buffer 103 to the transmission electrode 101. An electric field develops when the drive pulse is applied to the transmission electrode 101. When a finger is put in the electric field, the number of electric lines of force existing between the transmission electrode 101 and the receiving electrode 102 decreases. A change in the number of electric lines of force appears as a change in electric charges of the receiving electrode 102. An approach of the finger to the touch panel is detected by the change in the electric charges of the receiving electrode 102. An actual touch panel has the plurality of transmission electrode 101 and the plurality of receiving electrode 102 and two-dimensionally detects the finger.

FIGS. 19A to 19C are drawings showing a state of detection of the finger achieved when the finger is gradually brought closer to the touch panel. FIG. 19A shows a state in which the finger stays away from the electric field; FIG. 19B shows a state of detection of a hovering finger achieved when the finger has entered the electric field; and FIG. 19C shows a state of detection of a finger touch when the finger is fully in the electric field and remains in touch with the touch panel.

Hover manipulation awakes a response even when there is no touch with the touch panel. For this reason, there is a possibility that even user's unintended manipulation may have awaken a response. For instance, there is a response that will be awakened as a result of at least one finger approaching the touch panel when the housing is held with one hand or another response that will be awakened as a result of a base of the thumb approaching the touch panel when the touch panel is manipulated with one hand. The possibility of occurrence of such an erroneous operation becomes more noticeable when a casing trim of the housing becomes narrow or when the trim of the housing is rounded by making round edges between side surfaces and rear surface of the housing.

For instance, a fingertip touch determination device and a fingertip touch determination method that are described in connection with Patent Document JP-A-2012-164060 are mentioned as a technique for preventing the touch panel from responding to the user's unintended manipulation. Descriptions in Patent Document JP-A-2012-164060 mention that a determination can be made with high accuracy as to whether or not a fingertip remains in touch with a touch panel by evaluating kurtosis on the basis of values and positions of sensors of the touch panel where a peak appears in a data distribution of the sensor values.

SUMMARY

However, in relation to the fingertip touch determination device and the fingertip touch determination method that are described in connection with Patent Document JP-A-2012-164060, the data distribution of sensor values varies from a trim of the touch panel to the other area of the touch panel. For this reason, there is a possibility that a determination cannot be made with accuracy as to whether a thing approaching or remaining in touch with the touch panel is a fingertip or a part of a side or flat of a hand. Difficulty is encountered in sufficiently preventing performance of operation, which would otherwise be caused by user's unintended manipulation.

The invention has been conceived in light of the circumstance and aims at providing an electronic device and a method for determining coordinates that make it possible to sufficiently prevent an electronic device, which is equipped with a touch panel by means of which hover manipulation for enabling performance of manipulation at a position distant from a touch panel can be performed, from performing user's unintended manipulation.

According to one aspect of the invention, there is provided an electronic device comprising:

a display section having a display surface; and a touch panel that is superimposed on the display section and configured to detect a first width of an area occupied by an indicator and a second width orthogonal to the first width in which the occupied area is on a predetermined plane which is approximately parallel to and spaced apart by a predetermined distance from the display surface, wherein coordinates of a point corresponding to the area are taken as valid coordinates when flattening of the area determined from the first width and the second width is smaller than a predetermined value.

In the above configuration, when flattening of the area occupied by the indicator is smaller than a predetermined value in which the occupied area is on the predetermined plane spaced apart from the display surface by a predetermined distance, coordinates of a point corresponding to the area are taken as valid coordinates. Accordingly, performance of operation, which would otherwise be caused by user's unintended manipulation, can be sufficiently prevented during hover manipulation. For instance, given that the indicator is the thumb and that the predetermined value is a value that enables determination of flattening of a fingertip of the thumb, the finger tip of the thumb and a base of the thumb can be distinguished from each other when manipulation is performed with the thumb. Thus, faulty operation, which would otherwise be performed by detection of the base of the thumb, can be prevented.

In addition, a determination is made as to whether or not the point corresponds to the area on the predetermined plane occupied by the indicator on the basis of the flattening of the area. Therefore, it is possible to determine with accuracy if a thing approaching or remaining in touch with the touch panel even at a circumference of the touch panel is a fingertip, a side surface of the hand, or a portion of the flat part of the hand.

In the above electronic device, coordinates of a point corresponding to the area may be taken as valid coordinates when the flattening is smaller than a predetermined value, and the coordinates of the point corresponding to the area may not be taken as valid coordinates at least when the flattening is greater than the predetermined value.

In the above electronic device, coordinates of a center point of the area may be taken as valid coordinates when the flattening is smaller than the predetermined value.

In the above electronic device, the valid coordinates may be at least two-dimensional coordinates along the display surface.

In the above electronic device, the predetermined distance may be a value that is greater than zero.

In the above electronic device, the display surface may assume a predetermined shape, and the predetermined value may become smaller toward a center of the predetermined shape of the display surface.

In the configuration, the predetermined value is made smaller toward the center of the rectangular display surface, whereby a uniform determination can be made from the center to the circumference of the touch panel.

In the above electronic device, the predetermined value may be set in two steps.

In the above electronic device, a border at which the predetermined value may be set in two steps corresponds to a predetermined distance from a circumference toward the center of the predetermined shape of the display surface.

In the above electronic device, the predetermined distance from the circumference toward the center may be 8 mm.

In the above electronic device, coordinates of a point corresponding to the area may be taken as valid coordinates when the flattening is smaller than a predetermined value;

the coordinates of the point corresponding to the area may not be taken as valid coordinates at least when the flattening is greater than the predetermined value; and when the flattening is smaller than the predetermined value and when the coordinates of the point corresponding to the area are taken as valid coordinates, the coordinates of the point corresponding to the area may be taken as valid coordinates even when the flattening has subsequently become greater than the predetermined value.

In the electronic device, wherein the predetermined value may be taken as a first predetermined value;

the coordinates of the point corresponding to the area may be taken as valid coordinates when the flattening is smaller than the first predetermined value;

the coordinates of the point corresponding to the area may not be taken as valid coordinates at least when the flattening is greater than the predetermined value; and when the flattening is smaller than the first predetermined value and when the coordinates of the point corresponding to the area are taken as valid coordinates, the coordinates of the point corresponding to the area may be kept as valid coordinates even when the flattening has subsequently become greater than the first predetermined value and smaller than a second predetermined value that is larger than the first predetermined value, and may not be taken as valid coordinates when the flattening has subsequently become greater than the second predetermined value.

According to another aspect of the invention, there is provided an electronic device comprising:

a display section having a display surface; and a touch panel that is superimposed on the display section and configured to detect at least two areas occupied by indicators in which the occupied areas are on a predetermined plane which is approximately parallel to and spaced apart by a predetermined distance from the display surface, wherein one of the two detectable areas is taken as a first area, and the other is taken as a second area, and coordinates of a point corresponding to the first area are taken as valid coordinates when first flattening of the first area is smaller than second flattening of the second area.

In the above electronic device, when the first flattening of the first area occupied by the indicator is smaller than the second flattening of the second area occupied by the indicator, coordinates of a point corresponding to the first area may be taken as valid coordinates, and coordinates of a point corresponding to the second area may not be taken as valid coordinates.

In the above electronic device, the valid coordinates can be displayed on the display section.

In the above electronic device, the touch panel may be capacitive.

According to still another aspect of the invention, there is provided a method for determining coordinates that can be utilized in an electronic device comprising a display section having a display surface; and a touch panel that is superimposed on the display section and configured to detect a first width of an area occupied by an indicator and a second width orthogonal to the first width in which the occupied area is on a predetermined plane which is approximately parallel to and spaced apart by a predetermined distance from the display surface, wherein coordinates of a point corresponding to the area are taken as valid coordinates when flattening of the area determined from the first width and the second width is smaller than a predetermined value.

According to the method, when flattening of the area occupied by the indicator is smaller than a predetermined value in which the occupied area is on the predetermined plane spaced apart from the display surface by a predetermined distance, coordinates of a point corresponding to the area are taken as valid coordinates. Accordingly, performance of operation, which would otherwise be caused by user's unintended manipulation, can be sufficiently prevented during hover manipulation. For instance, given that the indicator is the thumb and that the predetermined value is a value that enables determination of flattening of a fingertip of the thumb, the finger tip of the thumb and a base of the thumb can be distinguished from each other when manipulation is performed with the thumb. Thus, faulty operation, which would otherwise be performed by detection of the base of the thumb, can be prevented.

In addition, a determination is made as to whether or not the point corresponds to the area on the predetermined plane occupied by the indicator on the basis of the flattening of the area. Therefore, it is possible to determine with accuracy if a thing approaching or remaining in touch with the touch panel even at a circumference of the touch panel is a fingertip, a side surface of the hand, or a portion of the flat part of the hand.

The invention makes it possible to sufficiently prevent performance of operation, which would otherwise be caused by user's unintended manipulation, during hover manipulation that enables performance of manipulation at a position distant from the touch panel.

BRIEF DESCRIPTION OF THE DRAWINGS

FIG. 8 is a chart showing a threshold value map used in Example Application 1 of the electronic device shown in FIG. 1;

FIGS. 19A to 19C are drawings showing a state in which a finger is detected when a hand is gradually brought closer to the touch panel.

DETAILED DESCRIPTION OF EMBODIMENTS

A preferred embodiment for implementing the invention is hereunder described in detail by reference to the drawings.

Figure 1:
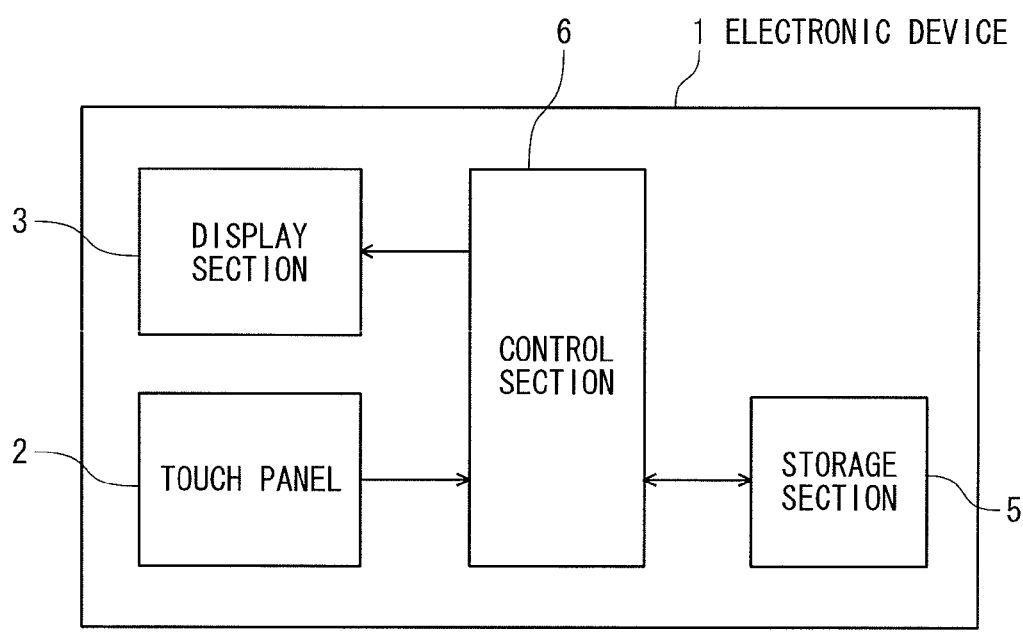
FIG. 1 is a block diagram showing a general configuration of an electronic device of an embodiment of the invention.
Figure 2:
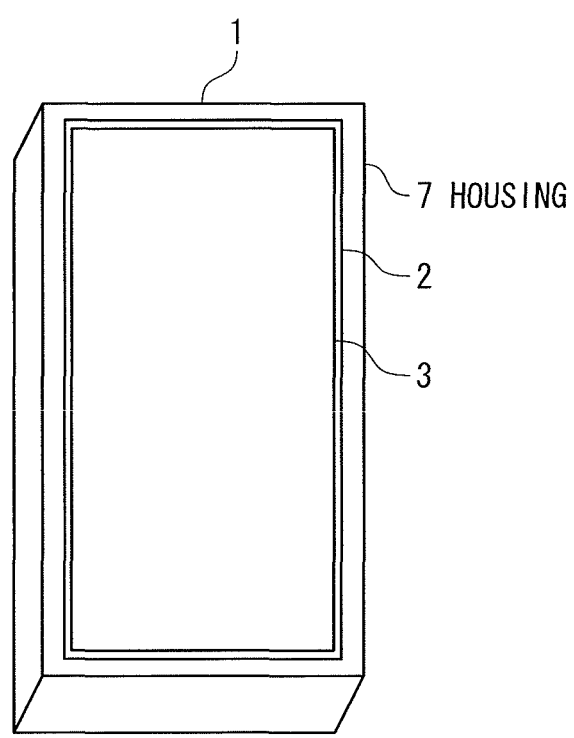
FIG. 2 is a perspective view showing an external view of the electronic device shown in FIG. 1.

FIG. 1 is a block diagram showing a general configuration of an electronic device of an embodiment of the invention. FIG. 2 is a perspective view showing an external view of the electronic device shown in FIG. 1. In this connection, the electronic device 1 of the embodiment corresponds to an application of the invention to; for instance, a portable radio communication device called a smartphone. A part of the portable radio communication device that works as a radio is omitted from the block diagram shown in FIG. 1.

In FIG. 1, the electronic device 1 of the embodiment has a touch panel 2, a display section 3, a storage section 5, and a control section 6. As shown in FIG. 2, the electronic device 1 of the embodiment has a longitudinally, rectangular housing 7. The touch panel 2 and the display section 3 are provided on a front face of the housing 7. Each of the touch panel 2 and the display section 3 assumes a planar shape that is slightly smaller than an area of the front face of the housing 7 and formed into a longitudinally, rectangular shape when viewed from top. In this case, an area of the display section 3 is slightly smaller than an area of the touch panel 2. The touch panel 2 is placed and superimposed over a display surface side of the display section 3, so that a panel surface of the touch panel 2 becomes essentially parallel to the display surface of the display section 3.

Figure 18:
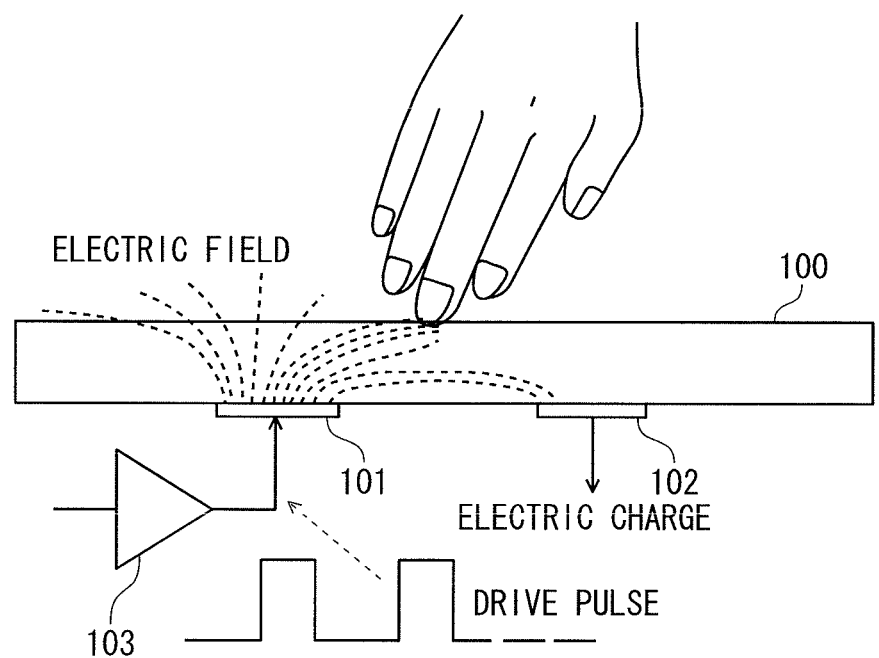
FIG. 18 is a drawing showing a general configuration of a capacitive touch panel.

The touch panel 2 adopts a capacitive system that enables performance of manipulation (called "hover manipulation") at a height within a predetermined range without contact of an indicator (corresponds to a user's finger, a pen, or the like) with the panel surface of the touch panel 2. As shown in FIG. 18, the touch panel 2 is equipped with a transmission electrode 101 and a receiving electrode 102, and the electrodes are positioned at a distance from each other under a bottom surface of a plate-shaped dielectric 100. A drive pulse derived from a transmission signal is applied to the transmission electrode 101. The transmission electrode 101 receives the applied drive pulse, whereupon an electric field develops. When the indicator enters the electric field, the number of electric lines of force between the transmission electrode 101 and the receiving electrode 102 decreases, and a change in the number of electric lines of force appears as a change in electric charge of the receiving electrode 102. The touch panel 2 has the plurality of transmission electrodes 101 and the plurality of receiving electrodes 102 and two-dimensionally detects the indicator. The touch panel 2 detects the indicator, thereby outputting coordinates (x, y) of the center of the indicator over the display surface of the display section 3 and a vertical distance (z) between the indicator and the panel surface of the touch panel 2 to the control section 6. The touch panel 2 outputs to the control section 6 a width Wx of a response area along an X-axis direction and a width Wy of the response area along a Y-axis direction, wherein the response area is commensurate with an indicator-occupied region on a predetermined plane that is spaced apart from the display surface of the display section 3 by a predetermined distance.

Figure 3:
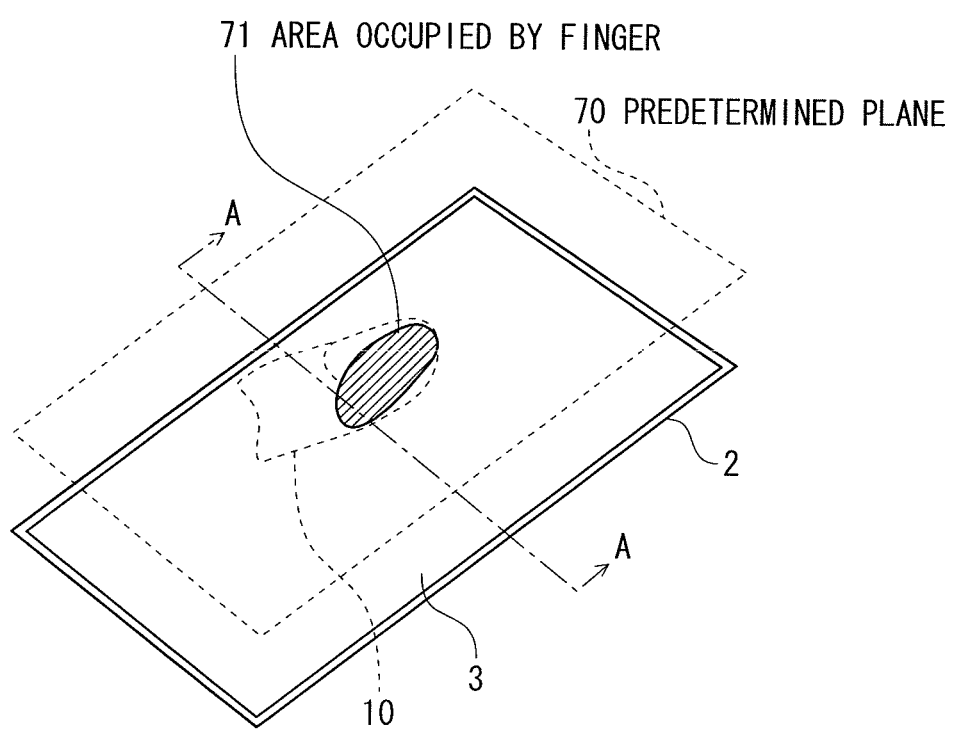
FIG. 3 is a perspective view showing a touch panel and a predetermined surface of the electronic device shown in FIG. 1.
Figure 4:
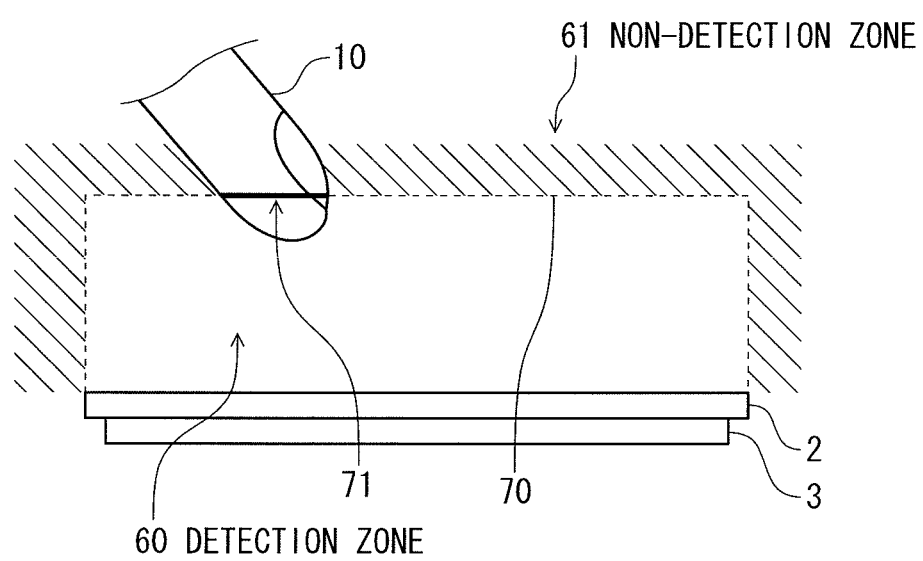
FIG. 4 is a cross sectional view taken along line A-A shown in FIG. 3.

FIG. 3 is a perspective view showing the touch panel 2 and a predetermined plane 70. FIG. 4 is a cross sectional view taken along line A-A shown in FIG. 3. In FIGS. 3 and 4, a detection zone 60 for the touch panel 2 is present above the panel surface of the touch panel 2, and the predetermined plane 70 is virtually set within the detection zone. A non-detection zone 61 exists outside the detection zone 60. In FIG. 4, the predetermined plane 70 is set at the outermost position of the detection zone 60. However, the predetermined plane 70 can be set at any position, so long as a distance from the display surface of the display section 3 is greater than 0 (zero). The distance from the display surface of the display section 3 becomes greater than 0 by an amount corresponding to the thickness of the touch panel 2. However, the thickness of the touch panel 2 is disregarded.

Figure 5:
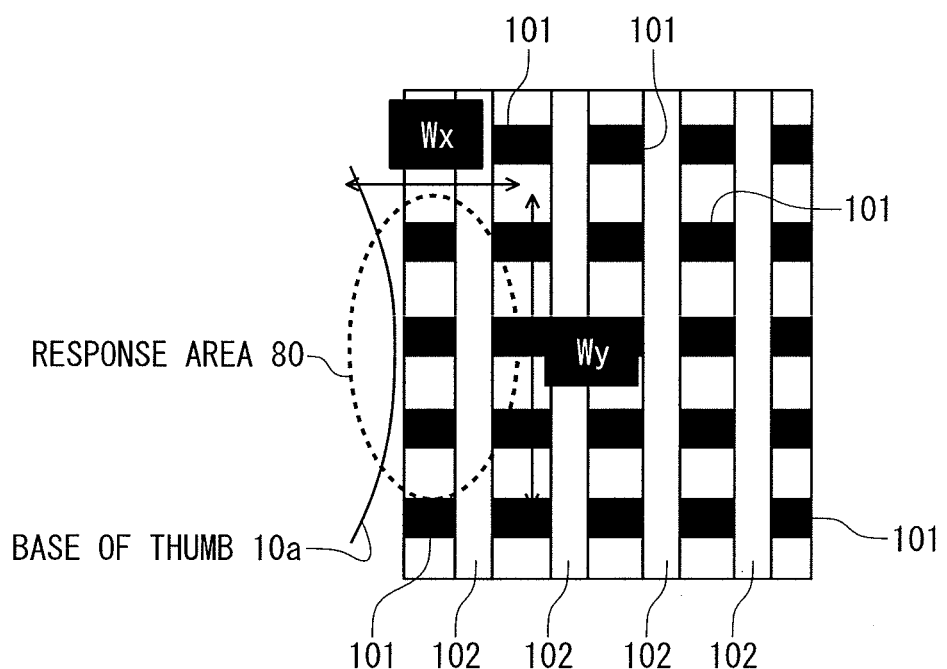
FIG. 5 is a diagram showing a response area on the electric device shown in FIG. 1 achieved when a base of a thumb has approached an end of the touch panel of the electronic device shown in FIG. 1.
Figure 6:
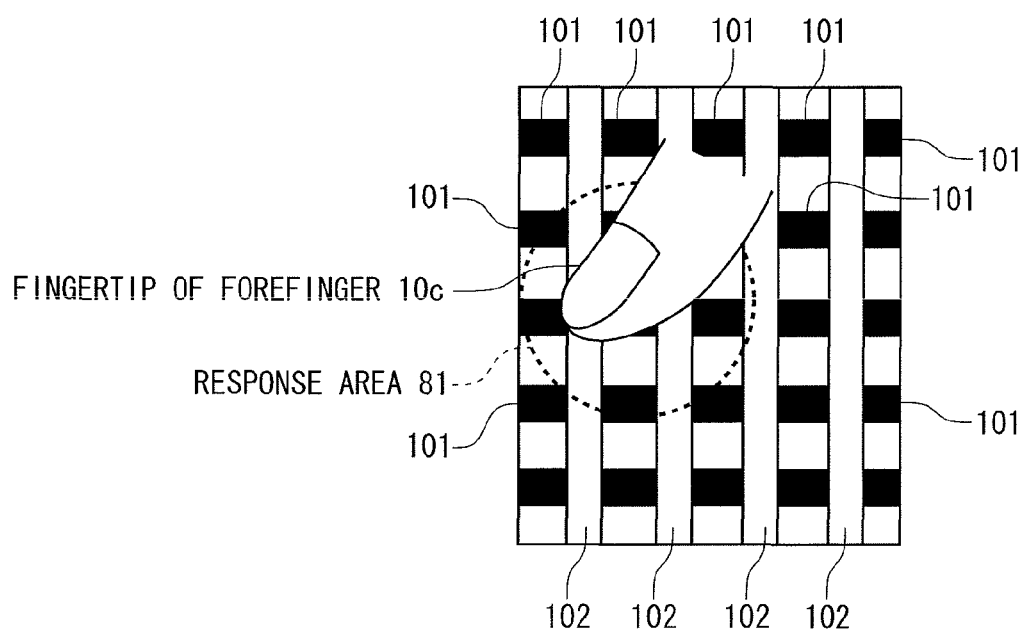
FIG. 6 is a diagram showing another response area achieved when a fingertip of a forefinger has approached a position close to the center from the end of the touch panel of the electronic device shown in FIG. 1.

When a finger 10 corresponding to the indicator enters the detection zone 60, the touch panel 2 outputs to the control section 60 the width Wx of a response area along the X-axis direction and the width Wy of the response area along the Y-axis direction, wherein the response area is commensurate with an area 71 on the predetermined plane 70 occupied by the finger 10. From the viewpoint of a relationship between the transmission electrode 101 and the receiving electrode 102, the response area commensurate with the area 71 assumes an essentially circular shape except a trim of the touch panel 2. The response area assumes a vertically-elongated or horizontally-elongated elliptical shape. Since only electrodes situated at the end of the touch panel 2 causes a response along the trim of the touch panel 2, the response area assumes a vertically-elongated or horizontally-elongated elliptical shape. FIG. 5 is a diagram showing a response area 80 achieved when a base 10a of a thumb has approached an end of the touch panel 2. FIG. 6 is a diagram showing a response area 81 achieved when a fingertip 10c of a forefinger has approached a position close to the center from the end of the touch panel 2. As shown in FIGS. 5 and 6, the response area 80 responded to the base 10a of the thumb assumes a vertically-elongated elliptical shape, and the response area 81 responded to the fingertip 10c of the forefinger assumes an essentially circular shape.

Turning back to FIG. 1 and FIG. 2, the display section 3 assumes a rectangular shape and is used for a display intended for manipulating the electronic device 1 and a display of an image or the like. A display device, such as an LCD (Liquid Crystal Display), an organic EL (Electro Luminescence), and electronic paper, is used for the display section 3. The storage section 5 has volatile memory, like DRAM (Dynamic Random Access Memory), and stores settings when a user makes settings for using the electronic device 1.

The control section 6 is made up of a CPU (Central Processing Unit), ROM (Read Only Memory), RAM (Random Access Memory), and an interface circuit. A program for controlling the CPU is stored in the ROM, and the RAM is used for operation of the CPU.

For instance, in a pointer mode, the control section 6 displays a pointer (omitted from the drawings) at a position on a screen of the display section 3 corresponding to coordinates (x, y) output from the touch panel 2. When the pointer is situated at this time on an icon (omitted from the drawings) displayed on the display section 3, the icon is determined to be selected by a user. When the user's finger touches the touch panel 2 or approaches in close proximity to the touch panel 2, a function assigned to the icon is activated.

The control section 6 calculates flattening from the width Wx of the response area along the X-axis direction and the width Wy of the response area along the Y-axis direction in which the response area is output from the touch panel 2. In this case, the flattening of the response area is determined according to Equation (1).

$$\text{Flattening ``}f\text{''}=1-(\min(Wx, Wy)/\max(Wx, Wy)) \quad (1)$$

where min(Wx, Wy) designates a minor axis of an ellipse, and max(Wx, Wy) designates a major axis of the ellipse.

After calculating the flattening of the response area, the control section 6 compares the thus-calculated flattening of the response area with a threshold value (a predetermined value). When the flattening of the response area is greater than a threshold value, coordinates (x, y) of the center of the response area are determined to be invalid. In contrast, when the flattening of the response area is smaller than the threshold value, the coordinates (x, y) of the center of the response area are determined to be valid. For instance, the response area 80 where the base 10a of the thumb shown in FIG. 5 is detected exhibits flattening that is a target of erroneous manipulation. Accordingly, the control section 6 determines the coordinates (x, y) of the center of the response area 80 as invalid coordinates. On the contrary, the response area 81 where the fingertip 10c of the forefinger shown in FIG. 6 is detected exhibits flattening that is not a target of erroneous manipulation. Hence, the control section 6 makes the coordinates (x, y) of the center of the response area 81 valid.

Figure 7:
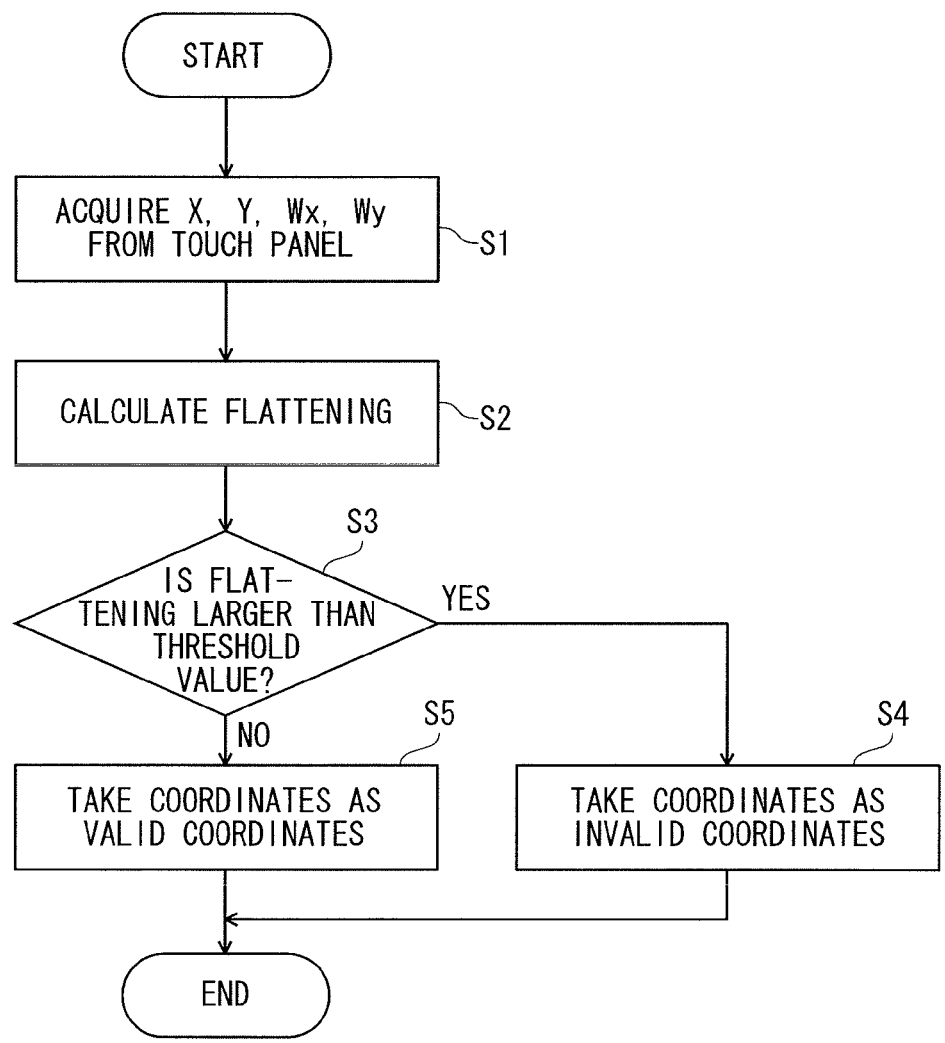
FIG. 7 is a flowchart showing processing in which a control section of the electronic device shown in FIG. 1 determines if coordinates are valid or invalid.

FIG. 7 is a flowchart for showing processing in which the control section 6 determines if coordinates are valid or invalid. In the drawing, the control section 6 acquires the coordinates (x, y) of the center of the response area and the width Wx of the response area along the X-axis direction and the width Wy of the response area along the Y-axis direction that have been output from the touch panel 2 (step S1). Next, after flattening of the response area is determined, the flattening is compared with a predetermined threshold value (step S3). When the flattening exceeds the threshold value (when "Yes" is rendered in step S3), the coordinates (x, y) of the center of the response area are made invalid (step S4), whereupon processing is completed. Meanwhile, when the flattening is the threshold value or less (when "No" is rendered in step S3), the coordinates (x, y) of the center of the response area are made valid (step S5), and processing is completed. Since the control section 6 periodically acquires the coordinates (x, y) from the touch panel 2, the control section performs aforementioned processing each time the coordinates (x, y) are acquired.

As above, the electronic device 1 of the embodiment is equipped with the display section 3 having the display surface and the touch panel 2 that is superimposed on the display section 3; that is essentially parallel to the display surface of the display section; and that can detect a finger-occupied area on a predetermined plane which is spaced apart from the display surface by a predetermined distance. When the flattening of the area, occupied by the finger, on the predetermined plane that is spaced apart from the display surface of the display section 3 by a predetermined distance is smaller than the threshold value, the coordinates (x, y) of the center of the area are made valid. In contrast, when the flattening is greater than the threshold value, the coordinates (x, y) of the center of the area are made invalid. Hence, performing operation in response to user's unintended manipulation, which would otherwise occur during hover manipulation, can be sufficiently prevented. For instance, when the thumb is taken as the indicator and when a value that enables determination of flattening of the fingertip of the thumb is taken as the predetermined value, the fingertip and the base of the thumb can be distinguished from each other, so that erroneous manipulation can be prevented by detecting the base of the thumb.

Further, since a determination is made as to whether the point corresponding to the area is valid or not, on the basis of the flattening of the area on the predetermined plane occupied by the indicator, a determination can be made with accuracy, even at the end of the touch panel 2, as to whether a thing approaching or remaining in contact with the touch panel is the finger tip or a side or flat of the hand.

Although the electronic device 1 of the embodiment stores in ROM a program which describes processing represented by the flowchart shown in FIG. 7, the program can also be distributed while being stored in a storage medium, such as a magnetic disc, an optical disc, a magneto-optical disc, and flash memory or downloaded by utilization of a telecommunication line while being stored in a server (omitted from the drawings) in a network like the Internet.

The electronic device 1 of the embodiment corresponds to the application of the invention to a portable radio communication device called a smartphone. However, in addition to the portable radio communication device, the invention is also applicable to a home electric appliance, such as a microwave oven, a control panel of an automobile navigation system, and the like.

Example applications of the electronic device 1 of the embodiment are now described.

Example Application 1

Figure 8:
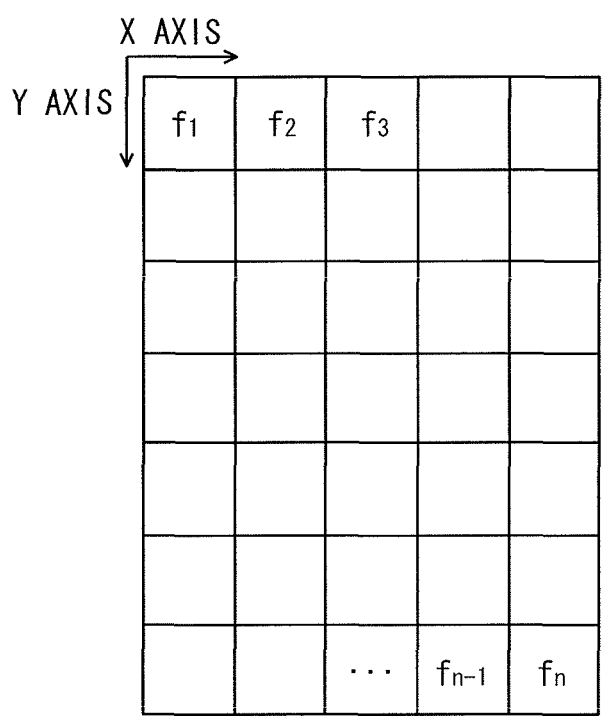
Figure 9:
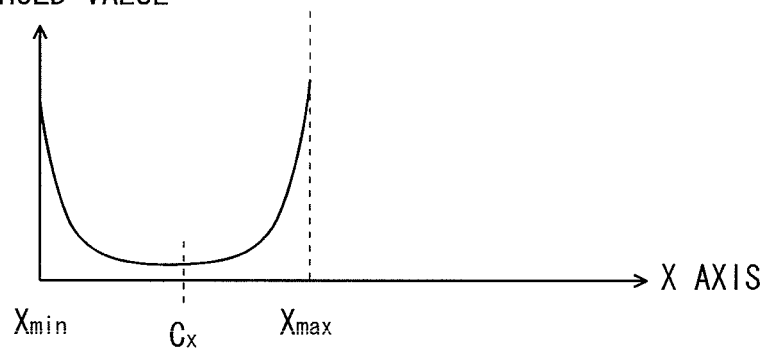
FIG. 9 is a graph showing a threshold value curve used in Example Application 1 of the electronic device shown in FIG. 1.
Figure 9:
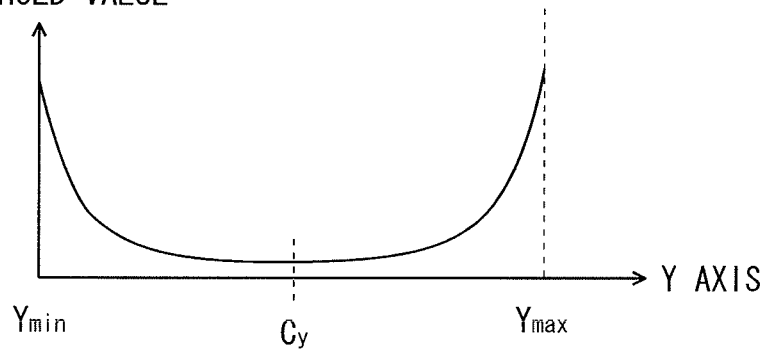

In relation to the electronic device 1 of the embodiment, a threshold value used for determining an erroneous determination is set to a given value. However, the threshold value can also be changed according to the response position. FIG. 8 is a chart showing a map of threshold values f1, f2, f3, . . . , fn−1 corresponding to the coordinates (x, y) on the touch panel. Threshold values corresponding to the coordinates (x, y) are acquired by use of the threshold value map shown in the drawing. FIG. 9 is a graph showing a threshold value curve corresponding to "x" values of the coordinates (x, y) on the touch panel 2 and a threshold value curve corresponding to "y" values of the coordinates (x, y). The threshold value curves shown in the drawings are for a case where the display surface of the display section 3 is formed into a rectangle. The "x" values become smaller toward a center Cx, and the "y" values also become smaller toward a center Cy. The threshold value is calculated from the coordinates (x, y) by use of the threshold value curves.

Figure 10:
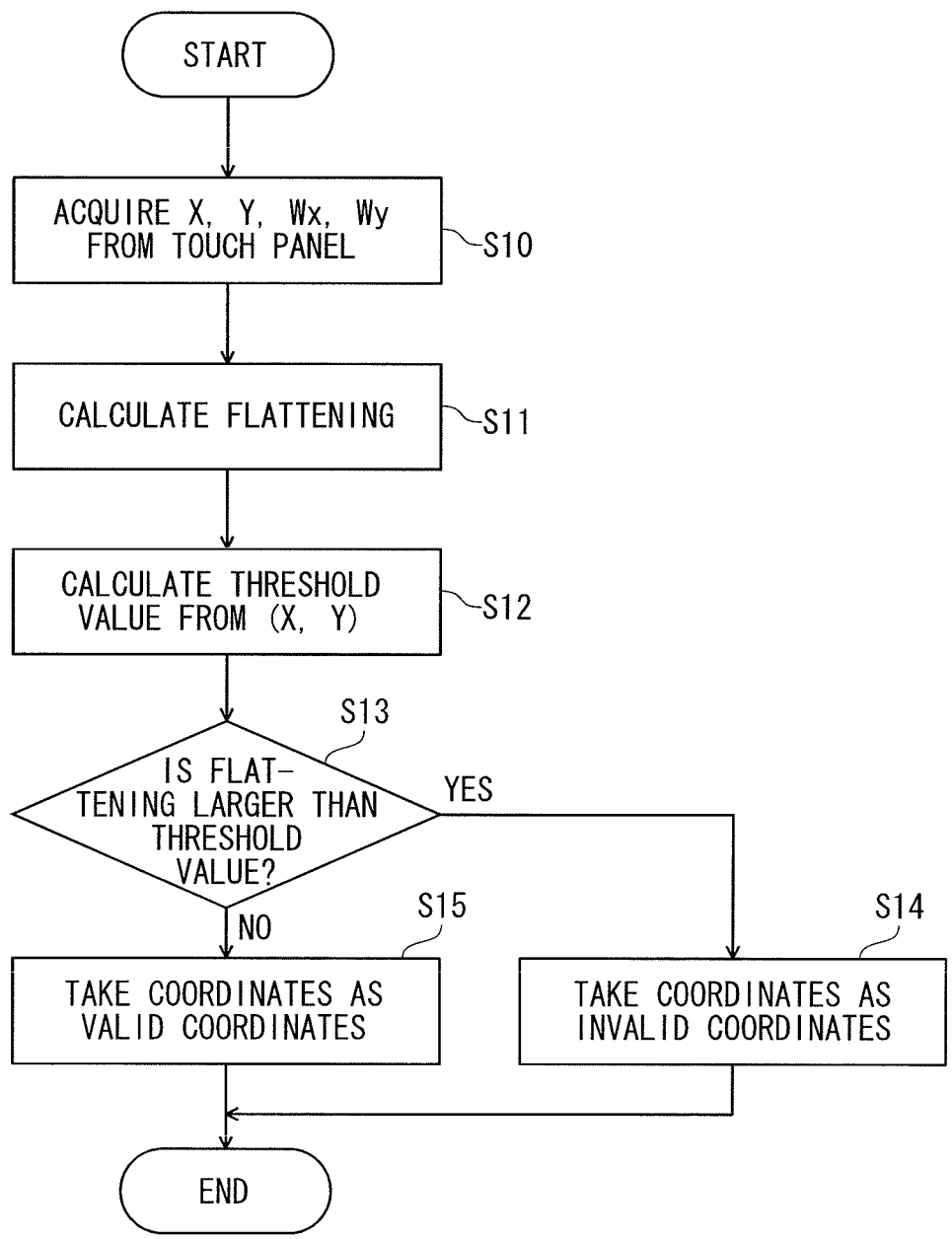
FIG. 10 is a flowchart showing processing in which a control section of Example Application 1 of the electronic device shown in FIG. 1 determines if coordinates are valid or invalid.

FIG. 10 is a flowchart showing processing in which the control section 6 of Example Application 1 determines if coordinates are valid or invalid. In the drawing, the control section 6 acquires coordinates (x, y) of the center of the response area output from the touch panel 2 and the width Wx of the response area achieved along the X-axis direction and the width Wy of the response area achieved along the Y-axis direction (step S10). Next, flattening of the response area is calculated by use of Equation (1) that is used for determining flattening (step S11). After the flattening of the response area is determined, the threshold is calculated from the coordinates (x, y) of the center of the response area (step S12). The thus-determined threshold value is compared with the flattening (step S13). When the flattening is greater than the threshold value (when "Yes" is rendered in step S13), the coordinates (x, y) of the center of the response area are taken as invalid coordinates (step S14). Thus, processing is completed. On the other hand, when the flattening is the threshold value or less (when "No" is rendered in step S13), the coordinates (x, y) of the center of the response area are made valid (step S15). Processing is thus completed.

Example Application 2

Figure 11:
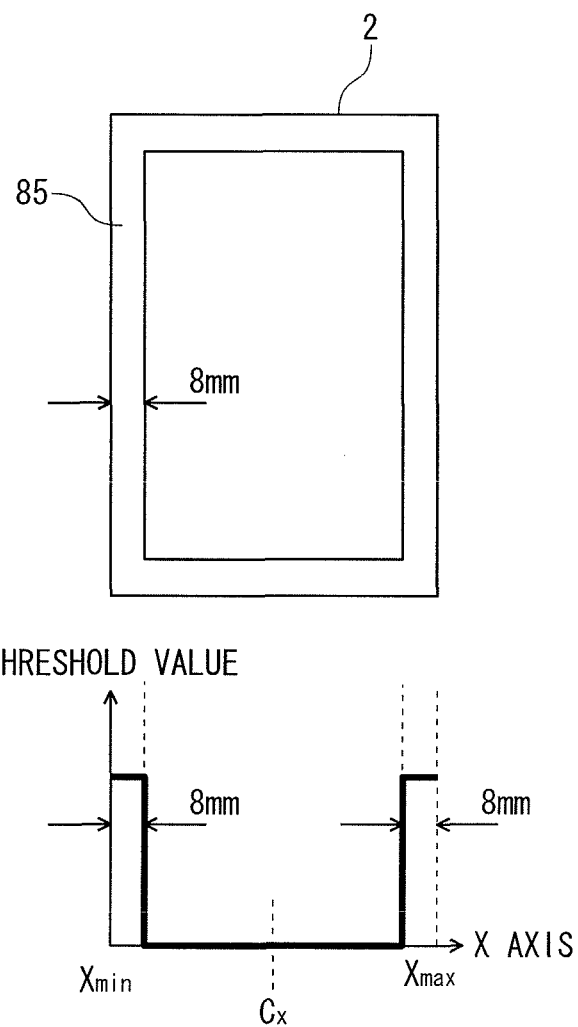
FIG. 11 is a diagram showing two-step threshold values used in Example Application 2 of the electronic device shown in FIG. 1 and areas on the touch panel where the respective threshold values are set.

The threshold value is changed as in the case with Example Application 1. The threshold value is set in two steps. FIG. 11 is a diagram showing two-step threshold values and areas on the touch panel 2 where the threshold values are set. A border at which the threshold value is set in two steps corresponds to a predetermined distance (for instance, 8 mm) from an outer circumference toward a center in a predetermination geometry of the display surface of the display section 3. The boundary is equivalent to an end 85 of the touch panel 2.

Figure 12:
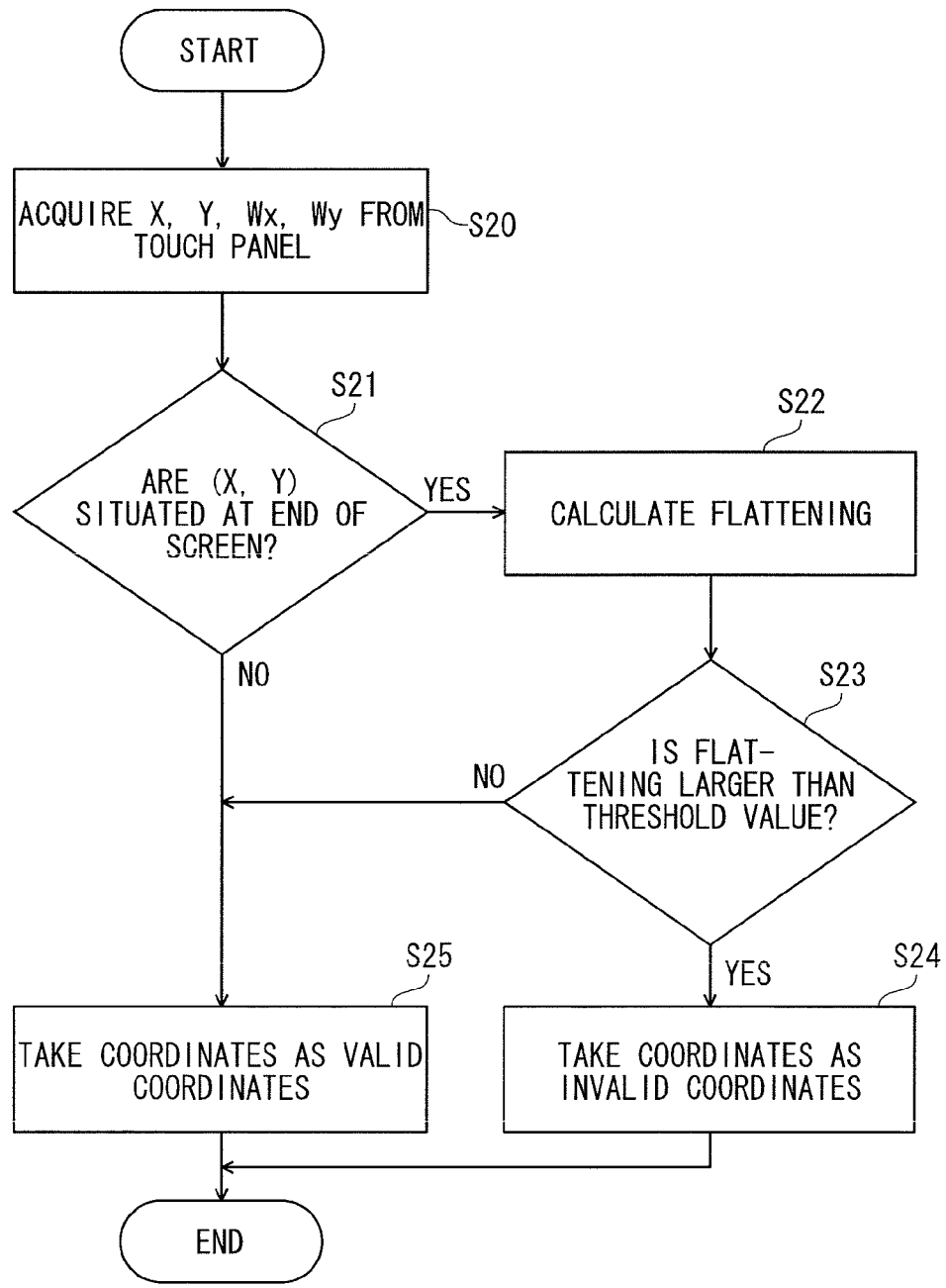
FIG. 12 is a flowchart showing processing in which a control section of Example Application 2 of the electronic device shown in FIG. 1 determines if coordinates are valid or invalid.

FIG. 12 is a flowchart showing processing in which the control section 6 of Example Application 2 determines if coordinates are valid or invalid. In the drawing, the control section acquires coordinates (x, y) of the center of the response area and the width Wx and the width Wy of the response area acquired along the X-axis and Y-axis directions (step S20). Next, a determination is made as to whether or not the coordinates (x, y) of the center of the response area coincide with the end of the screen (step S21). When the coordinates (x, y) of the center of the response area coincide with the end of the screen (when "Yes" is rendered in step S21), the flattening of the response area is calculated by use of Equation (1) that determines flattening (step S22). After flattening of the response area is calculated, the thus-calculated flattening is compared with the threshold value (step S23). When the flattening is larger than the threshold value ("Yes" is rendered in step S23), the coordinates (x, y) of the center of the response area are made invalid (step S24), and processing ends. On the other hand, when the flattening is the threshold value or less (when "No" is rendered in step S23), the coordinates (x, y) of the center of the response area are made valid (step S25), and processing ends. In the meantime, when the coordinates (x, y) of the center of the response area are determined not to coincide with the end of the screen by the determination pertinent to step S21 (when "No" is rendered in step S21), the coordinates (x, y) are made valid (step S25), and processing ends.

Example Application 3

Figure 13:
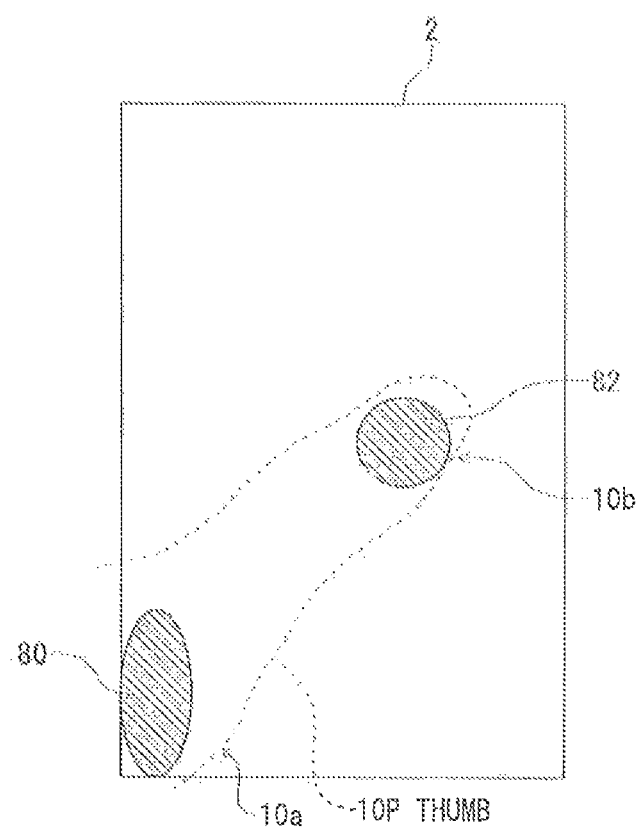
FIG. 13 is a chart showing a difference in flattening between a response area that has responded to the base of the thumb and a response area that has responded to the fingertip of the forefinger in Example Application 3 of the electronic device shown in FIG. 1.

Example Application 3 is for prioritizing coordinates which exhibit small flattening when a set of coordinates is selected from a plurality of coordinates (x, y) on the touch panel 2 is selected. The plurality of coordinates (x, y) include; for instance, coordinates (x1, y1) of the fingertip of the forefinger and coordinates (x2, y2) of the base of the thumb. FIG. 13 is a drawing that shows difference in flattening between a response area (a second area) 80 responded to the base 10*a* of a thumb 10P and a response area (a first area) 82 responded to a finger tip 10*b* of the thumb 10P. As illustrated in the drawing, the flattening of the response area responded to the base 10*a* of the thumb 10P becomes large, whilst the flattening of the response area responded to the fingertip 10*b* of the thumb 10P becomes small. Manipulation performed by means of the base 10*a* of the thumb 10P that exhibits large flattening turns into faulty manipulation, so that occurrence of faulty manipulation can be prevented by selecting the response area that exhibits small flattening.

Figure 14:
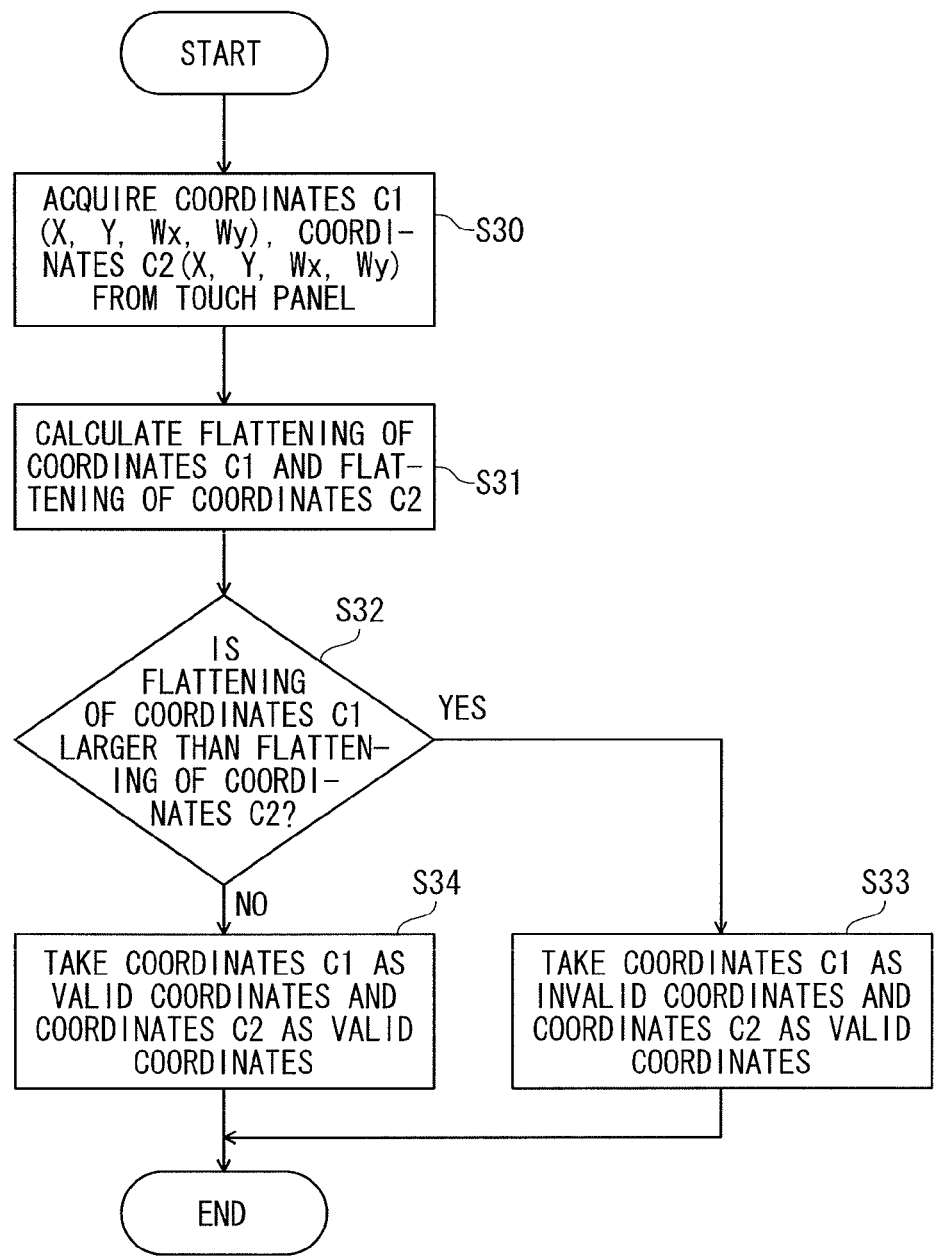
FIG. 14 is a flowchart showing processing in which a control section of Example Application 3 of the electronic device shown in FIG. 1 determines if coordinates are valid or invalid.

FIG. 14 is a flowchart showing processing in which a control section 6 of Example Application 3 determines if coordinates are valid or invalid. In the drawing, the control section 6 acquires coordinates C1 (x1, y1), coordinates C2 (x2, y2), a width Wx1 and a width Wy1 of the coordinates C1 acquired along the X-axis direction and the Y-axis direction, and a width Wx2 and a width Wy2 of the coordinates C2 acquired along the X-axis direction and the Y-axis direction (step S30). Next, flattening of a response area located at the coordinates C1 and flattening of a response area located at the coordinates C2 are calculated by use of Equation (1) that determines flattening (step S31). After the flattening of the coordinates C1 and the flattening of the coordinates C2 are calculated, they are compared with each other (step S32). When the flattening of the response area located at the coordinates C1 is larger than the flattening of the response area located at the coordinates 02 (when "Yes" is rendered in step S32), the coordinates C1 are made invalid, and the coordinates C2 are made valid (step S33). Thus, processing ends. In the meantime, when the flattening of the response area located at the coordinates C1 is equal to or smaller than the flattening of the response area located at the coordinates C2

(when "No" is rendered in step S32), both the coordinates C1 and the coordinates C2 are made valid (step S34), and processing ends.

Example Application 4

Example Application 4 is for increasing the threshold value when a response area exhibiting great flattening exists at the end of the touch panel 2. The coordinates (x, y) at the end of the touch panel 2 are made undetectable with reference to a response area located at the end of the touch panel 2, whereby erroneous detection can be prevented.

Example Application 5

Figure 15:
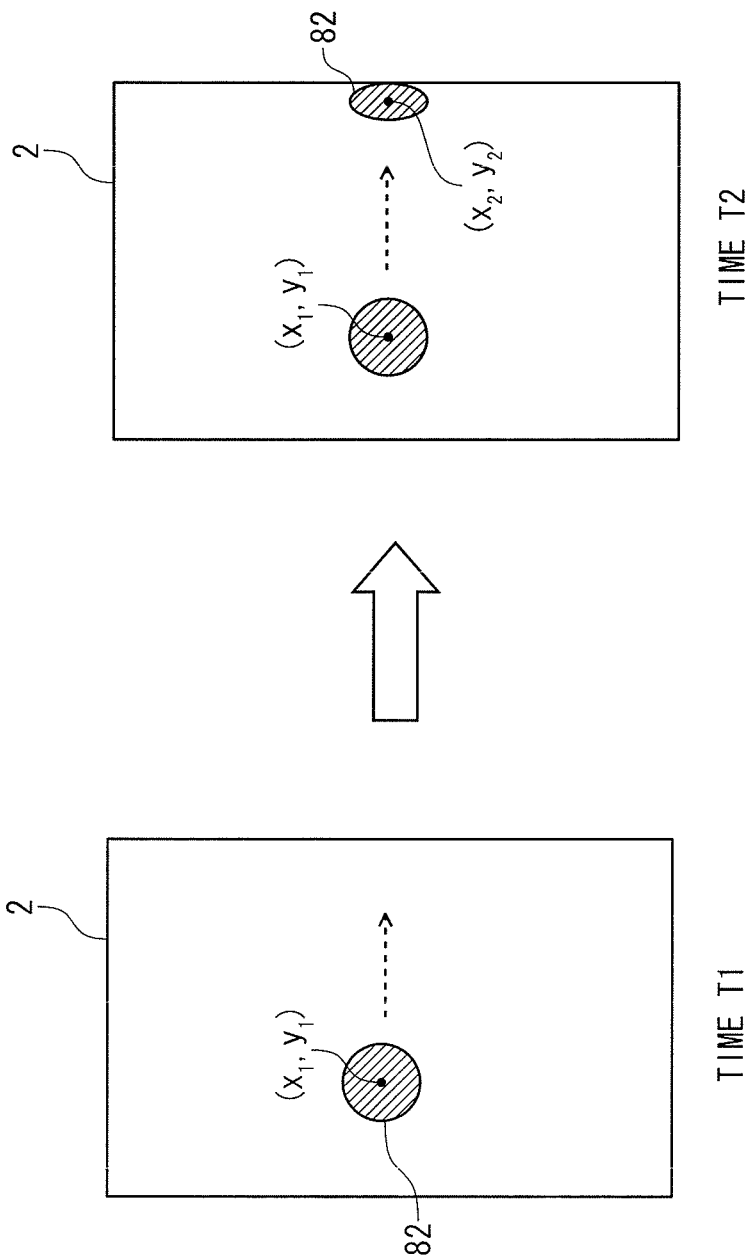
FIG. 15 is a chart showing a case where flattening of the response area has become larger as a result of coordinates (x1, y1) where the finger is detected around a center of the touch panel having moved to coordinates (x2, y2) at the end of the touch panel in Example Application 5 of the electronic device shown in FIG. 1.

Example Application 5 is for excluding flattening from the category of a determination of erroneous response when the flattening of the response area has become larger as a result of the coordinates (x, y) detected at the center of the touch panel 2 or in its surrounding having moved to the end of the touch panel 2. The reason for this is that, when user's manipulation has moved from the center to the end of the touch panel 2, the flattening of the response area may become larger even when response is not erroneous. FIG. 15 is a chart showing a case where the flattening of the response area 82 has become larger as a result of the coordinates (x1, y1) where the finger has been detected around the center of the touch panel having moved to the coordinates (x2, y2) at the end of the touch panel 2. As illustrated, the flattening of the response area 82 located in the vicinity of the center of the touch panel 2 assumes a small circular shape. However, when the response area moves to the end of the touch panel 2, the response area assumes the shape of an ellipse that exhibits large flattening, because no electrodes exist on the right side of the response area. In this case, since the coordinates are valid when the response area 82 is situated in the vicinity of the center of the touch panel 2, the coordinates are held valid rather than being invalidated even when the flattening becomes larger as a result of the response area having reached the end.

Figure 16:
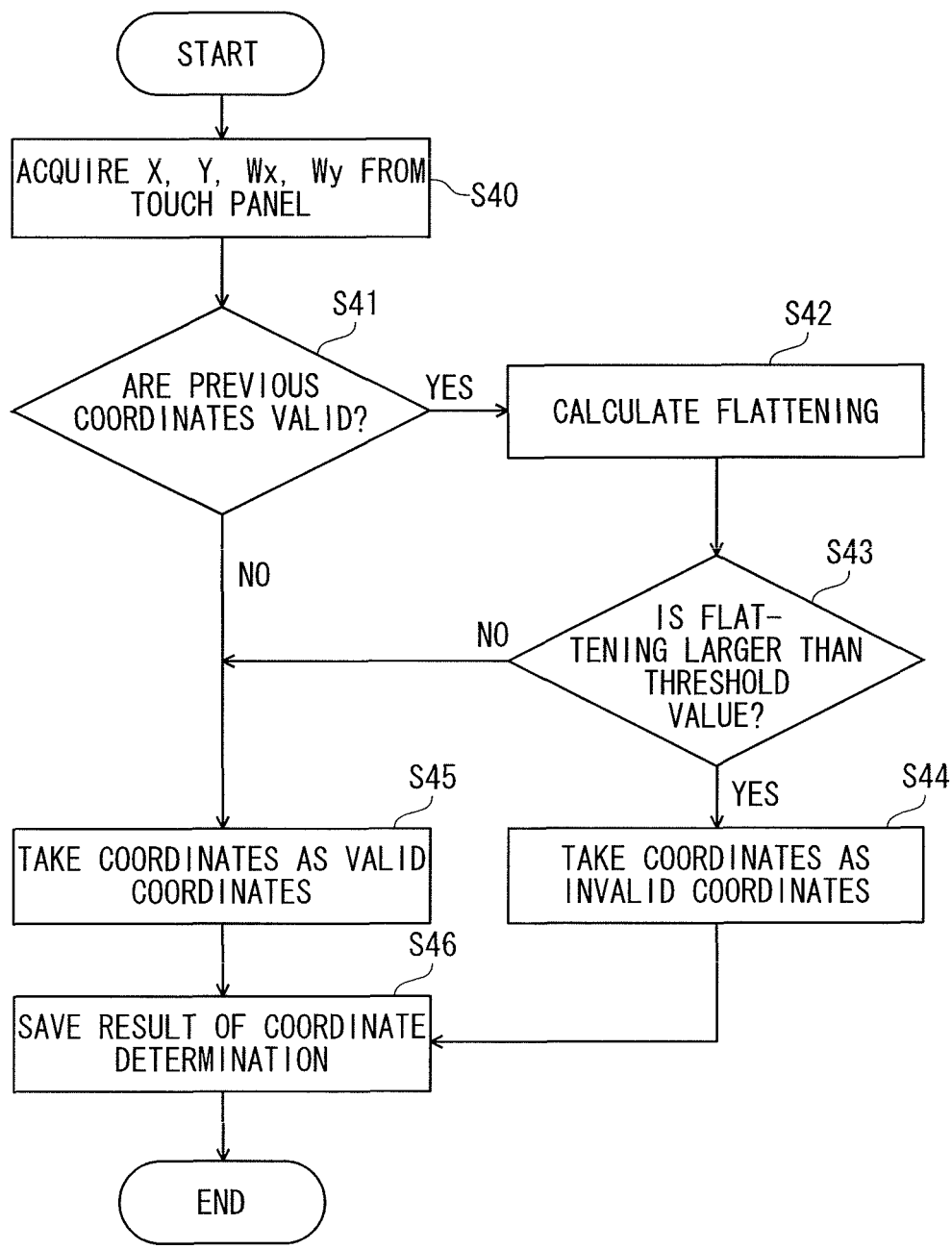
FIG. 16 is a flowchart showing processing in which a control section of Example Application 5 of the electronic device shown in FIG. 1 determines if coordinates are valid or invalid.

FIG. 16 is a flowchart showing processing in which a control section 6 of Example Application 5 determines if coordinates are valid or invalid. In the drawing, the control section 6 acquires the coordinates (x, y) of the center of the response area and the width Wx and the width Wy of the response area acquired along the X-axis direction and the Y-axis direction output from the touch panel 2 (step S40). Next, a determination is made as to whether or not the previous coordinates are valid (step S41). In this case, initial values of a result of coordinate determination are made "invalid." When the previous coordinates are determined not to be valid in the determination pertinent to step S41 (when "No" is rendered), flattening of the response area located at the current coordinates is calculated by use of Equation (1) that determines flattening (step S42). After the flattening of the response area located at the current coordinates is calculated, the thus-calculated flattening is compared with the threshold value (step S43). When the flattening of the response area located at the current coordinates is larger than the threshold value (when "Yes" is rendered in step S43), the current coordinates are made invalid (step S44). The result; namely, a result of coordinate determination, is saved, and processing ends (step 46). In the meantime, when the flattening of the response area at the current coordinates is the threshold value or less (when "No" is rendered in step S43), the current coordinates are made valid (step S45). When the previous coordinates are determined to be valid in the determination pertinent to step S41 (when "Yes" is rendered in step S41), the current coordinates are made valid (step S45). The result; namely, a result of coordinate determination, is saved, and processing ends (step S46). Processing is performed on a per-finger basis. In the case of multiple touches, a result of coordinate determination is saved for each finger, and a check is made, on a per-finger basis, as to whether or not the previous coordinates are valid.

Example Application 6

Example Application 6 is a modification of Example Application 5. Even when the coordinates are once determined to be valid, the coordinates are determined to be an erroneous response when the flattening of the response area has become extremely large, thereby making the coordinates invalid.

Figure 17:
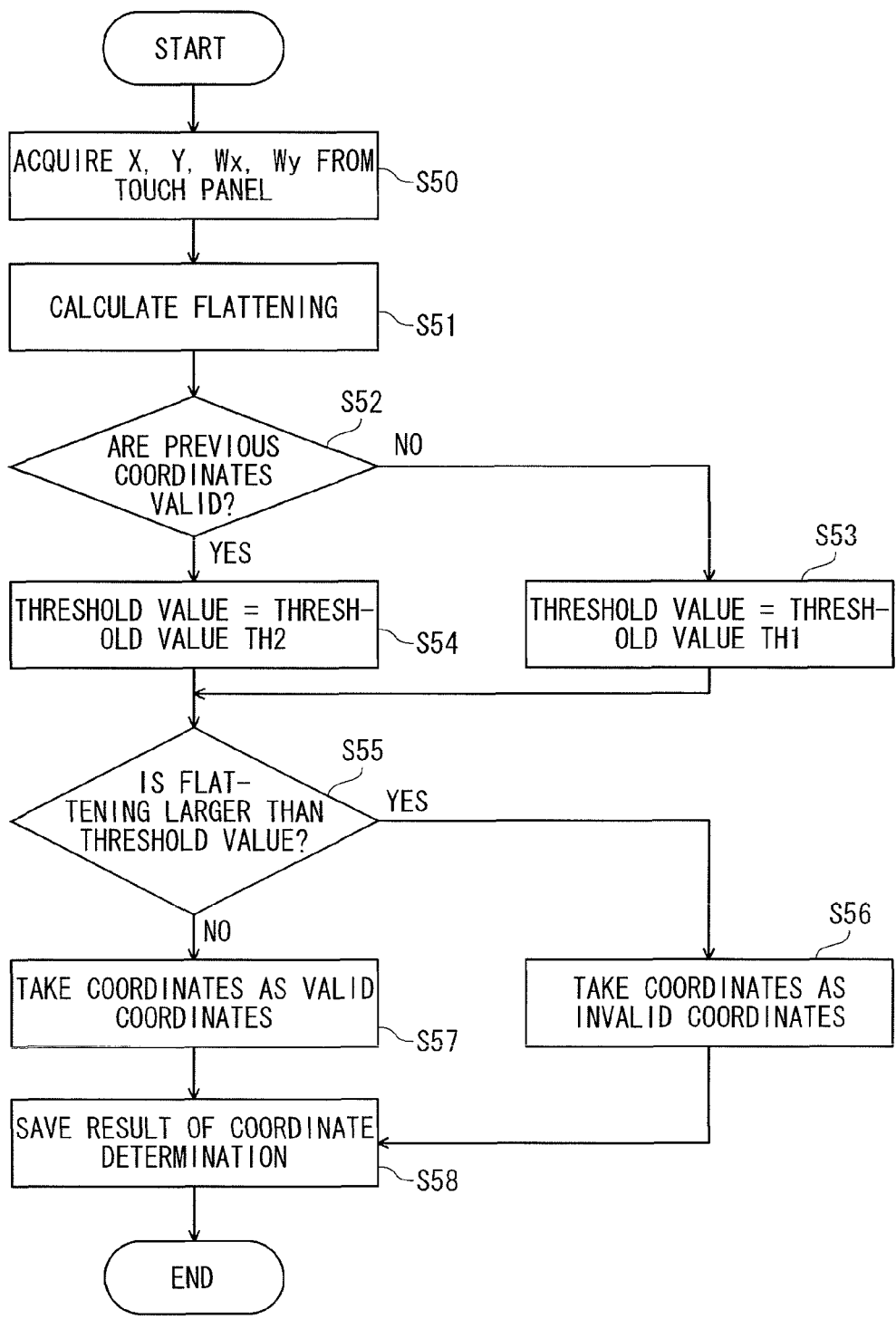
FIG. 17 is a flowchart showing processing in which a control section of Example Application 6 of the electronic device shown in FIG. 1 determines if coordinates are valid or invalid.

FIG. 17 is a flowchart showing processing in which a control section 6 of Example Application 6 determines if coordinates are valid or invalid. In the drawing, the control section 6 acquires the coordinates (x, y) of the center of the response area and the width Wx and the width Wy of the response area acquired along the X-axis direction and the Y-axis direction output from the touch panel 2 (step S50). Next, flattening of the response area located at the current coordinates is calculated by use of Equation (1) that determines flattening (step S51). After the flattening of the response area located at the current coordinates is calculated, a determination is made as to whether or not the previous coordinates are valid (step S52). When the previous coordinates are determined not to be valid in the determination pertinent to step S52 (when "No" is rendered), the threshold is taken as a threshold TH1 (threshold TH1: a threshold for ordinary flattening, or a first predetermined value) (step S53). On the other hand, when the previous coordinates are valid (when "Yes" is rendered), the threshold value is taken as a threshold value TH2 that is larger than the threshold value TH1 (threshold value TH2: a threshold value for flattening achieved after a determination is made as to whether or not coordinates are valid; namely, a second predetermined value) (step S54).

After the threshold value is set to the threshold value TH1 or the threshold value TH2, the flattening of the response area located at the current coordinates is compared with the threshold value (step S55). When the flattening of the response area located at the current coordinates is larger than the threshold value (when "Yes" is rendered in step S55), the current coordinates are made invalid (step S56). The result; namely, a result of coordinate determination, is saved (step S58), and processing ends. Meanwhile, when the flattening of the response area located at the current coordinates is the threshold value or less (when "No" is rendered in step S55), the current coordinates are made valid (step S57). The result, or the result of coordinate determination, is saved, and processing ends.

Flowcharts (FIG. 10, FIG. 12, FIG. 14, FIG. 16, and FIG. 17) employed in Example Applications 1, 2, 3, 5, and 6 and programs which describe the flowcharts are stored in ROM. However, the programs can also be distributed while being stored in a storage medium, such as a magnetic disc, an optical disc, a magneto-optical disc, and flash memory or downloaded by utilization of a telecommunication line while being stored in a server (omitted from the drawings) in a network like the Internet.

The invention yields an advantage of the ability to sufficiently prevent performance of user's unintended manipulation and can be applied to an electronic device that uses a capacitive touch panel, such as a smartphone.

What is claimed is:

1. An electronic device comprising:
   a display having a display surface having a predetermined shape; and
   a touch panel that is superimposed on the display and configured to detect a first width and a second width of an area occupied by an indicator on a predetermined plane, which is approximately parallel to and spaced by a predetermined distance from the display surface, the first width being orthogonal to the second width in the predetermined plane, wherein
   coordinates of a point corresponding to the area are obtained,
   a flattening of the area is obtained based on a ratio between the first width and the second width,
   a threshold value is determined based on the coordinates of the point, such that the threshold value decreases when the coordinates of the point becomes closer to a center of the predetermined shape of the display surface, and
   the coordinates of the point are taken as valid coordinates when the flattening of the area is smaller than the threshold value.

2. The electronic device according to claim 1, wherein the coordinates of the point corresponding to the area are not taken as valid coordinates at least when the flattening is greater than the threshold value.

3. The electronic device according to claim 1, wherein coordinates of a center point of the area are taken as valid coordinates when the flattening is smaller than the threshold value.

4. The electronic device according to claim 1, wherein the valid coordinates are at least two-dimensional coordinates along the display surface.

5. The electronic device according to claim 1, wherein the predetermined distance is a value that is greater than zero.

6. The electronic device according to claim 1, wherein the valid coordinates can be displayed on the display.

7. The electronic device according to claim 1, wherein the touch panel is capacitive.

* * * * *